(12) United States Patent
Creidenberg et al.

(10) Patent No.: US 12,465,411 B2
(45) Date of Patent: Nov. 11, 2025

(54) MEDICAL FIXATION MECHANISMS, SYSTEMS, AND METHODS

(71) Applicant: Invisian Medical, LLC, Prairie Village, KS (US)

(72) Inventors: Jan Creidenberg, Prairie Village, KS (US); Brogan Moroney, Prairie Village, KS (US); Omar Khan, Prairie Village, KS (US)

(73) Assignee: Invisian Medical, LLC, Prairie Village, KS (US)

( * ) Notice: Subject to any disclaimer, the term of this patent is extended or adjusted under 35 U.S.C. 154(b) by 346 days.

(21) Appl. No.: 18/106,256

(22) Filed: Feb. 6, 2023

(65) Prior Publication Data
US 2023/0248406 A1   Aug. 10, 2023

Related U.S. Application Data

(60) Provisional application No. 63/308,177, filed on Feb. 9, 2022.

(51) Int. Cl.
*A61B 17/84* (2006.01)
*A61B 17/82* (2006.01)

(52) U.S. Cl.
CPC ............ *A61B 17/842* (2013.01); *A61B 17/82* (2013.01)

(58) Field of Classification Search
CPC .......... A61B 17/842; A61B 2017/0414; Y10T 24/1404; Y10T 24/149; Y10T 24/1406
See application file for complete search history.

(56) References Cited

U.S. PATENT DOCUMENTS

| 1,235,217 | A | * | 7/1917 | McFee | B65D 63/14 24/18 |
| 1,647,398 | A | * | 11/1927 | Draheim | B65D 63/14 24/115 M |
| 1,654,764 | A | * | 1/1928 | Traynick | B65D 63/14 24/18 |
| 3,739,430 | A | * | 6/1973 | Kohke | B65D 63/1063 24/16 PB |
| 4,262,391 | A | * | 4/1981 | Peash | F16L 33/02 24/28 |
| 5,781,975 | A | * | 7/1998 | Wells, Jr. | B65D 63/1036 24/30.5 P |

(Continued)

OTHER PUBLICATIONS

International Search Report and Written Opinion in related PCT Application PCT/US23/12514 mailed May 3, 2023, 13 pages.

*Primary Examiner* — David W Bates
(74) *Attorney, Agent, or Firm* — Hovey Williams LLP

(57) ABSTRACT

A fixation mechanism that more effectively limits or prevents relative movement between two adjacent objects includes an elongated tie having a free end and a joined end and a clasp coupled to the joined end of the tie. The clasp includes a housing having an insertion channel in which the free end of the tie is inserted and an exit channel through which the tie exits such that the tie and clasp form a loop that connects the two adjacent objects. The clasp further includes a locking mechanism positioned in the housing between the insertion channel and the exit channel. The locking mechanism includes a locking tine that permits the free end of the tie to pass forwardly through the insertion channel and out the exit channel but grips the tie to prevent it from moving rearwardly out of the housing.

20 Claims, 10 Drawing Sheets

(56) References Cited

U.S. PATENT DOCUMENTS

| | | | | |
|---|---|---|---|---|
| 5,815,891 A | * | 10/1998 | Students | B65D 63/1036 24/17 AP |
| 6,473,942 B1 | * | 11/2002 | Caveney | B65D 63/1036 24/30.5 P |
| 6,484,367 B1 | * | 11/2002 | Caveney | B65D 63/1036 24/17 AP |
| 8,231,626 B2 | | 7/2012 | Hulliger et al. | |
| 9,038,246 B2 | | 5/2015 | Liang | |
| 10,480,688 B2 | | 11/2019 | Tschida et al. | |
| 11,045,235 B2 | * | 6/2021 | Johnson | A61B 17/82 |
| 12,365,524 B2 | * | 7/2025 | Cooper | F16L 3/2338 |
| 2001/0010110 A1 | * | 8/2001 | Matsushima | F16G 11/103 24/130 |
| 2006/0107494 A1 | * | 5/2006 | Liao | F16G 11/14 24/18 |
| 2018/0135780 A1 | * | 5/2018 | Tschida | B65D 63/1045 |
| 2019/0046244 A1 | * | 2/2019 | Nguyen | A61B 17/707 |

* cited by examiner

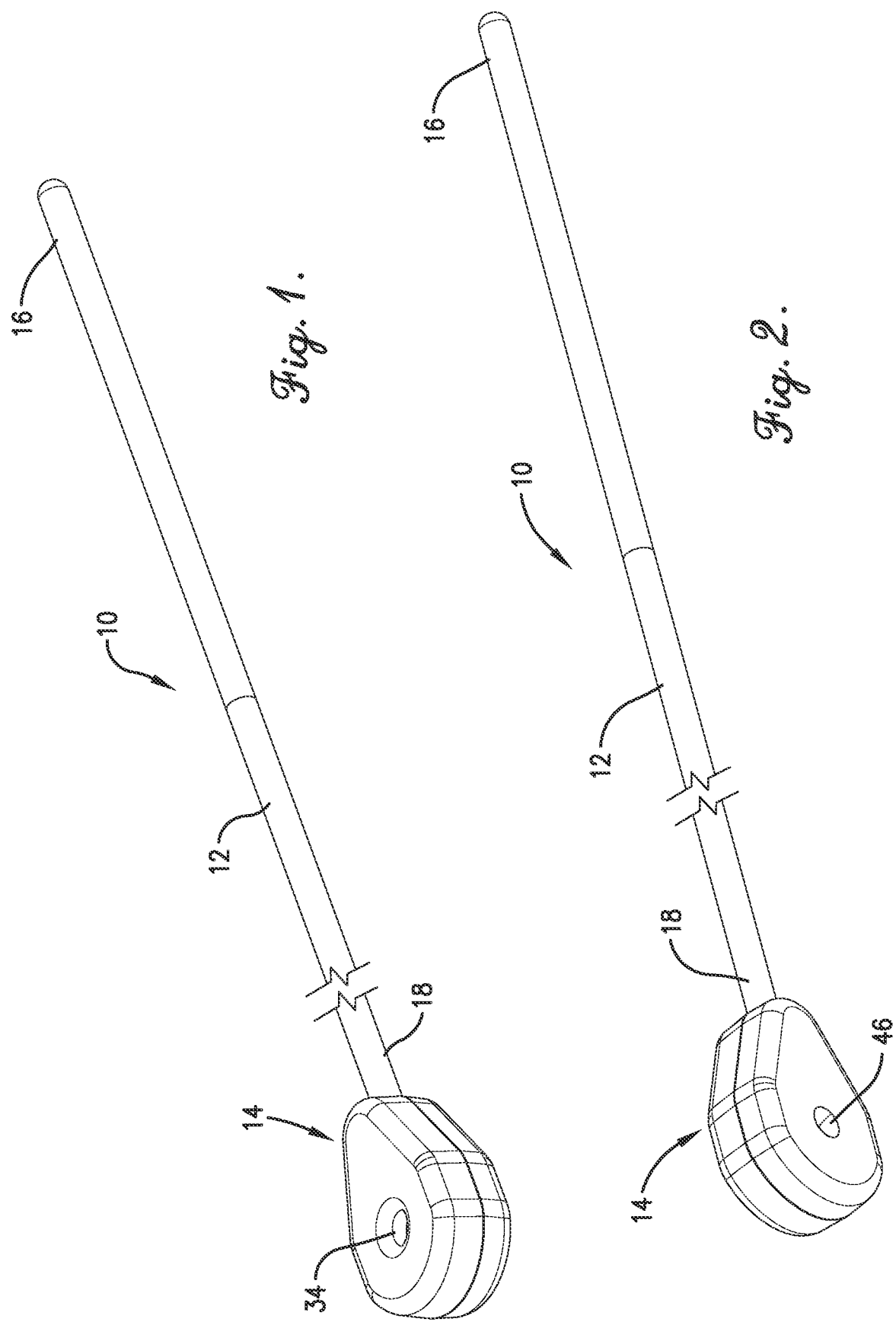

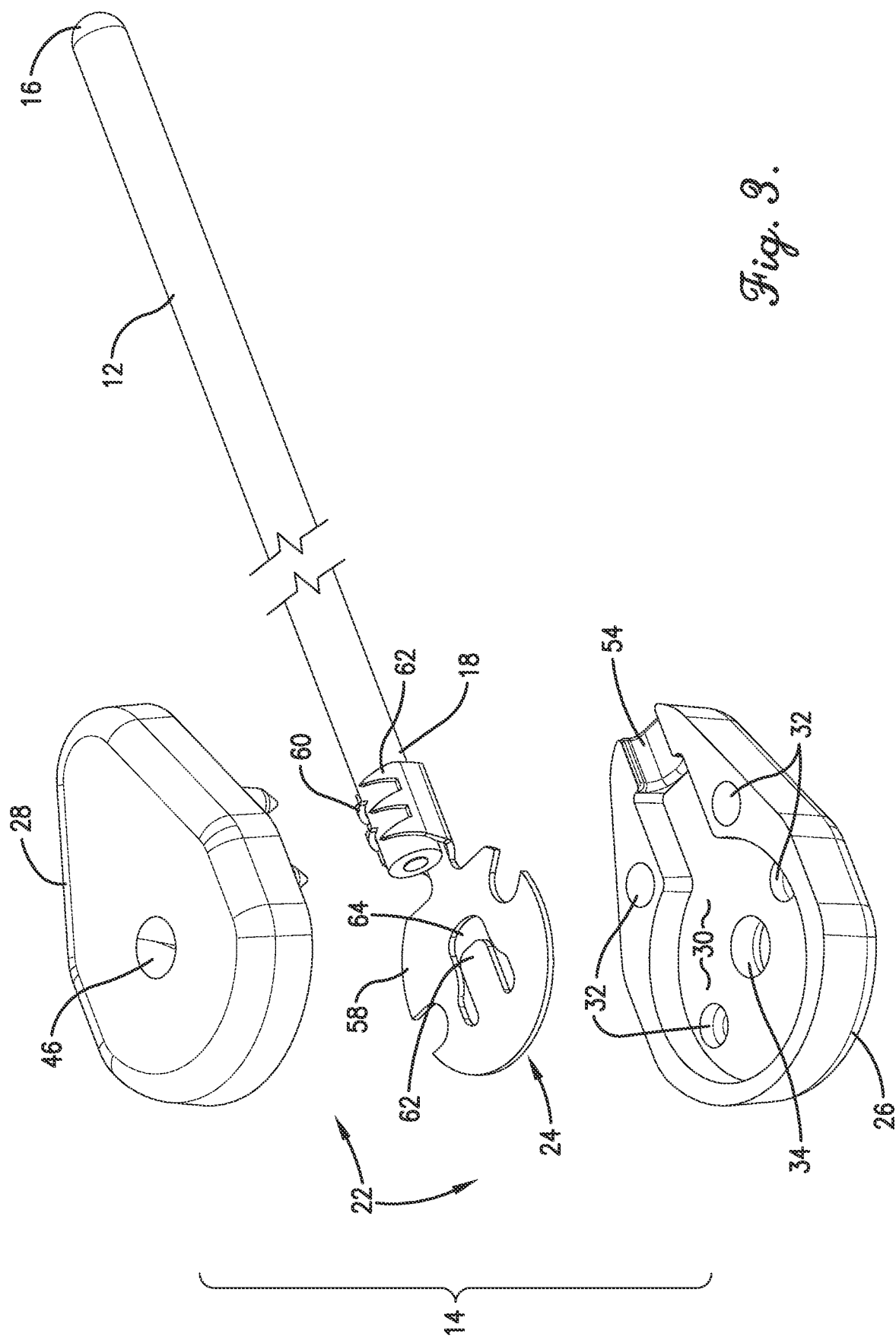

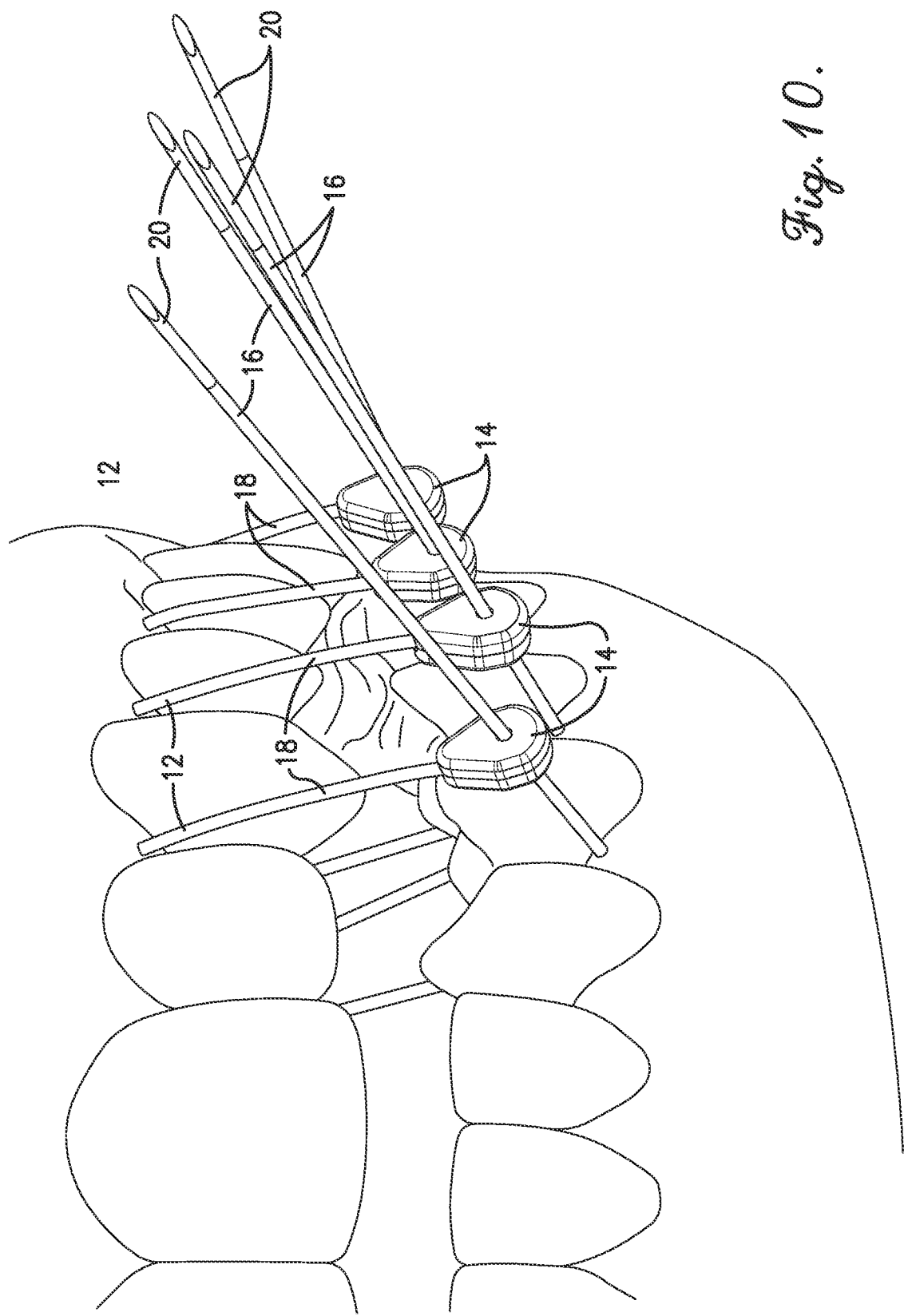

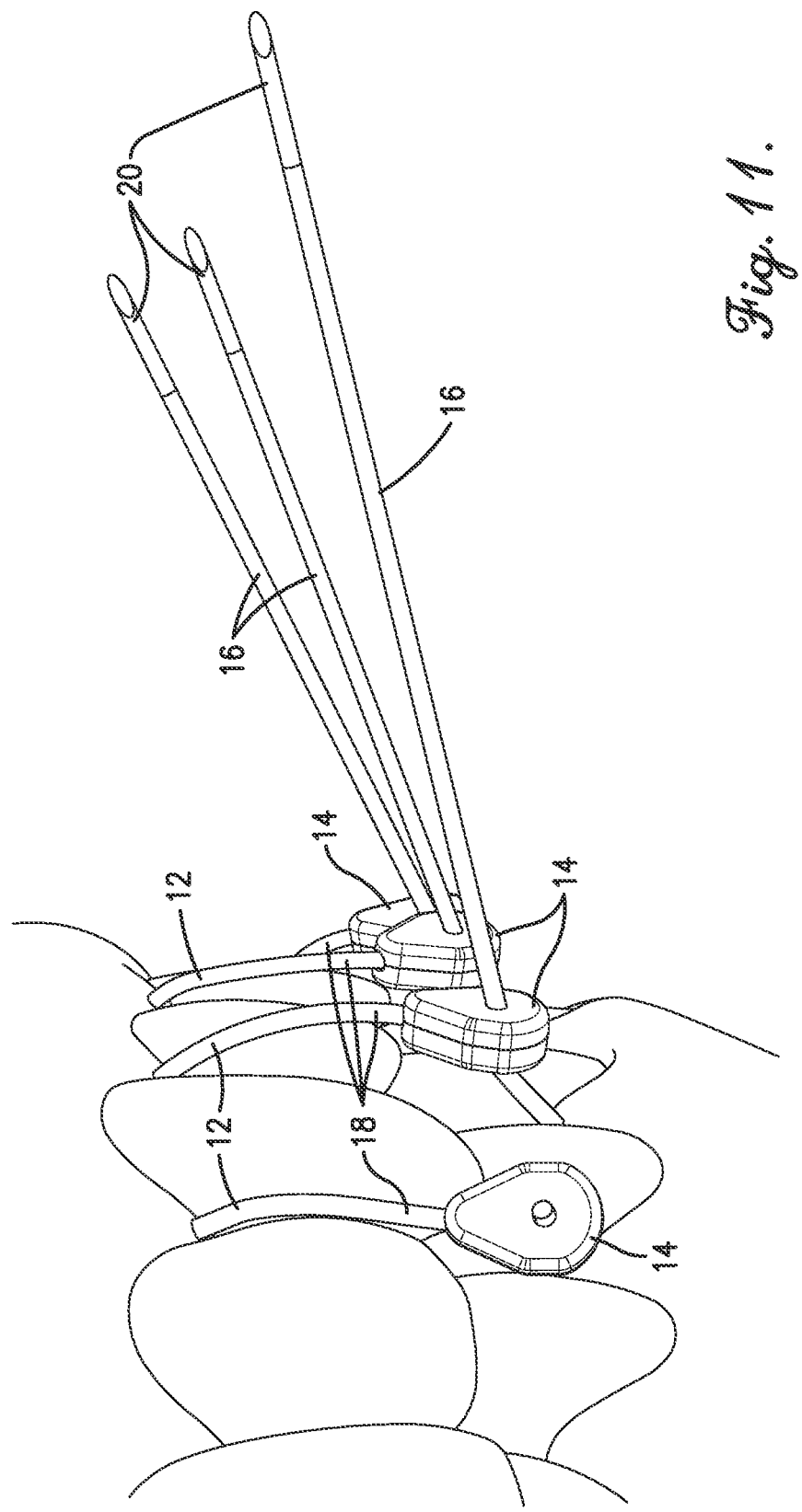

MEDICAL FIXATION MECHANISMS, SYSTEMS, AND METHODS

RELATED APPLICATIONS

This application is a non-provisional patent application and claims priority benefit with regard to all common subject matter of U.S. Provisional Patent Application No. 63/308,177, filed Feb. 9, 2022, and entitled "LOCKING TINE AND RATCHET LEVER LOCKING SYSTEM", which is hereby incorporated by reference in its entirety into the present application.

BACKGROUND

Medical securement ties or medical "zip ties" have been used in various medical applications including surgeries to treat trauma-related jaw fractures, replace temporomandibular joints, and to correct overbite, underbite, and sleep apnea (orthognathic surgery). Medical securement ties have also been used to close the chest bone plate (sternum) following thoracic/cardiac surgery.

A conventional medical securement tie includes a housing with an internal ratchet lever and an attached flexible elongated tie portion. The tie portion is smooth on one side and contains a row of alternating grooves and raised ribs (or teeth) along the opposite side. The free end of the tie is inserted in the housing such that the ratchet lever contacts the tie grooves and ribs and prevents the tie from moving backwardly out of the housing. This creates a loop that is tightened to a desired size to bound two relatively moveable objects within the loop.

Although these securement ties can be produced in a low-cost manner, they can only lock when the ratchet lever is forced against a groove and rib. To further tighten the loop, the ratchet lever must "jump" over a rib to the next groove on the tie. Thus, such ties do not allow for smooth, small tightening increments, as the ratchet lever must jump over each of the ribs to tighten. Further, the ribs on the tie portion may irritate or even cause trauma to human tissue, may not fit through other medical devices or hardware being utilized, or may damage other devices or medical hardware also in use.

U.S. Pat. No. 11,045,235, which is incorporated herein in its entirety by reference, describes a dental occlusion tie system for achieving maxillomandibular fixation that does not employ a ratchet lever-groove and rib system. This system uses a smooth tie or other flexible elongated body attached to a clasp. The clasp has a metal tine through which the tie passes in a forward, tightening direction. The clasp tine, also referred to as a locking tine, prevents the tie from moving backwards (in a loosening direction) once the tie has been inserted and slid past the locking tine.

Key to the performance of a tie system that operates without a ratchet lever/groove and rib design is that the locking tine must come into contact with the tie and maintain its position against the tie to prevent the tie from slipping and loosening. Unlike securement ties with a ratchet lever locking mechanisms, there are no ribs, grooves or other surface features on the tie portion to engage and create the locking action. The lock is completely reliant on the locking tine maintaining position against the tie, preventing the tie from moving backwards or loosening. Unfortunately, it is possible for the locking tine and tie to fail to fully engage. If this occurs, the tie can slip rearwardly out of the clasp, causing the tie system to loosen. It is also possible for the locking tine to bend too far away or backwards from the tie as the tie is threaded through the clasp. If this occurs, it is likely the locking tine will not come into contact with tie or it will insufficiently contact/engage the tie, and thus not create a secure locking effect.

SUMMARY

The present invention solves the above-described problems and provides a distinct advance in the art of fixation mechanism and systems. More particularly, the present invention provides a fixation mechanism that more effectively locks to limit or prevent relative movement between two adjacent objects.

A fixation mechanism constructed in accordance with an embodiment of the invention may be used in medical and non-medical applications and may be used in any quantity as part of a fixation system. An embodiment of the fixation mechanism broadly comprises an elongated tie and a clasp.

The tie may be any elongated mechanism that can be inserted in the clasp and has a free end and a joined end attached to the clasp. In one embodiment, the tie is a length of coated medical suture or stitch.

The clasp comprises a housing having an insertion channel in which the free end of the tie is inserted and an exit channel through which the tie exits such that the tie and clasp form a loop that connects two adjacent objects.

The clasp further comprises a locking mechanism positioned in the housing between the insertion channel and the exit channel. The locking mechanism includes a locking tine that permits the tie to pass forwardly through the insertion channel and out the exit channel but grips the tie to prevent it from moving rearwardly out of the housing.

To prevent the locking tine from bending too far away from the tie when the tie is passed through the housing, a stop is formed in the housing to limit movement of the locking tine. This ensures that the locking tine sufficiently grips the tie at all times to prevent the tie from loosening.

To further enhance the locking interaction between the tie and clasp, the insertion channel is sized and configured to guide the tie portion through the clasp in an optimal position and angle to maintain contact against the locking tine to ensure a consistently strong one-way lock. Similarly, the exit channel is sized and configured to guide the tie portion out of the clasp at an optimum position and angle to help maintain a consistently strong one-way lock.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 1 is a fragmented perspective view of a fixation mechanism constructed in accordance with an embodiment of the present invention.

FIG. 2 is another fragmented perspective view of the fixation mechanism.

FIG. 3 is an exploded perspective view of the fixation mechanism.

FIG. 10 is a perspective view showing several fixation mechanisms used in a fixation system to secure a patient's jaw.

FIG. 11 is a perspective view showing several fixation mechanisms fully tightened to secure a patient's jaw.

Figure 4:
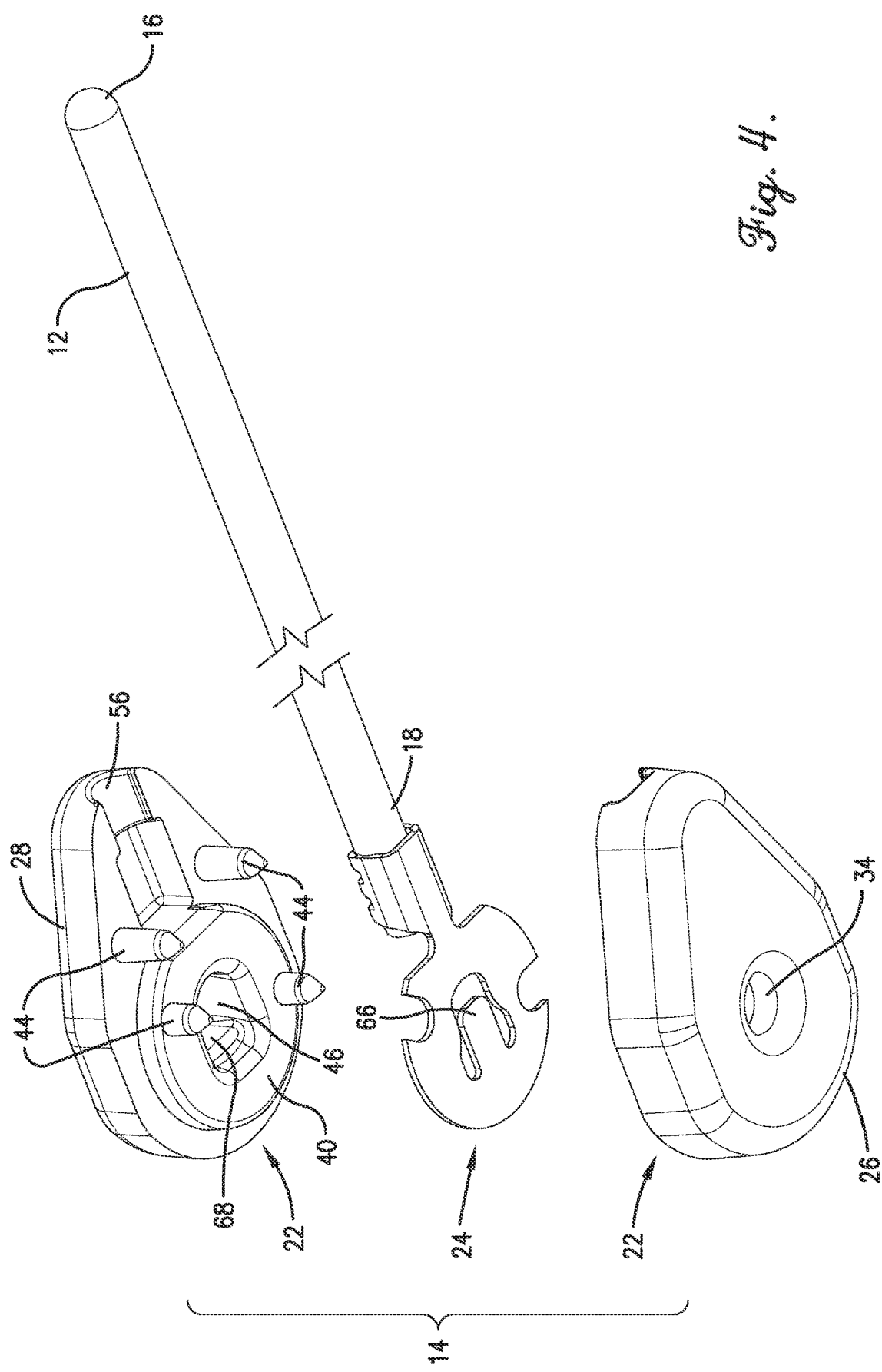
FIG. 4 is another exploded perspective view of the fixation mechanism.
Figure 5:
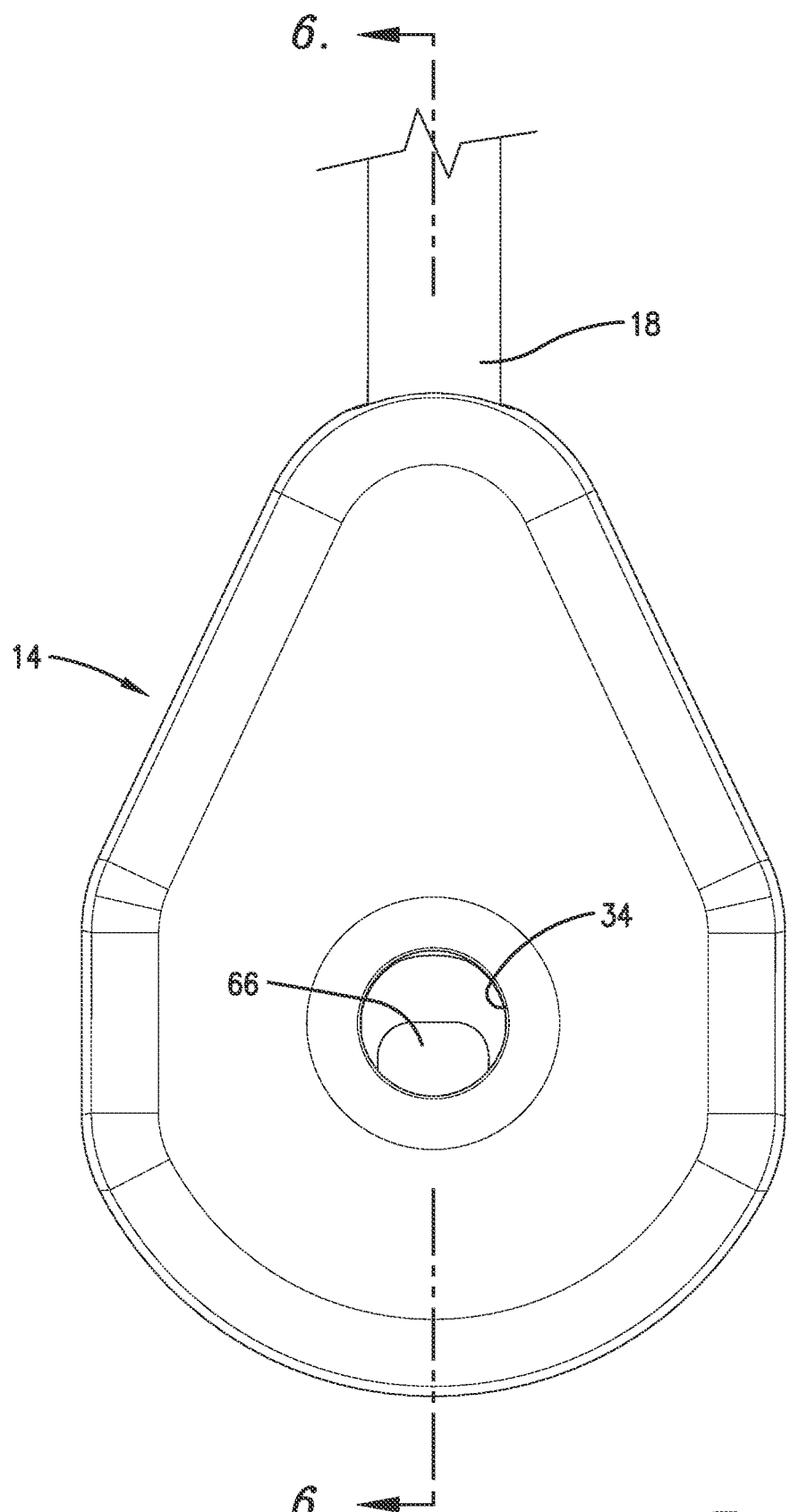
FIG. 5 is a partial top plan view of the fixation mechanism.

The drawing figures do not limit the present invention to the specific embodiments disclosed and described herein. The drawings are not necessarily to scale, emphasis instead being placed upon clearly illustrating the principles of the invention.

DETAILED DESCRIPTION

The present invention provides improved fixation mechanisms and systems that more effectively limit or prevent relative movement between two adjacent objects. The fixation mechanisms and systems may be used in medical and non-medical applications. Medical applications include, but are not limited to, jaw surgeries to treat jaw fractures, replace temporomandibular joints, and/or correct overbite, underbite, or sleep apnea. Other medical applications include closing a chest bone plate (sternum) following thoracic/cardiac surgery. Non-medical applications include, but are not limited to, securing doors, windows, gates, fences, and other moveable objects to adjacent door jams, posts, and other relatively non-movable objects; restraining arms or legs (similar to handcuffs); or securing lids, tops, etc. on boxes, shipping containers, and other enclosures. For all these applications and others, a single fixation mechanism may be used or multiple mechanisms may be used as part of a fixation system.

Turning initially to FIGS. 1 and 2, a fixation mechanism 10 constructed in accordance with an embodiment of the invention is illustrated and broadly comprises an elongated tie 12 and a clasp 14. The components of the fixation mechanism may be made of any suitable materials and in any shapes and sizes without departing from the principles of the invention.

The tie 12 may be any elongated member that can be wrapped around or otherwise attached to one or more relatively moveable objects and then inserted in the clasp 14. The tie 12 may be made of any materials and formed in a variety of different shapes. In one embodiment, the tie comprises a coated medical suture or stitch such as those provided by Invisian Medical, LLC under the brand name Minne Ties Agile MMF®. The tie may be any length, and in one embodiment, is between 2-10 inches long. The tie may be any diameter, and in one embodiment, has a diameter of 1.0 mm.

In one embodiment, the tie 12 has a free distal end 16 and a joined proximate end 18 coupled to the clasp 14. In this embodiment, the tie 12 and clasp 14 are configured for forming a loop to surround or otherwise attach to and limit relative movement between adjacent objects such as jaws, fence gates and posts, etc.

In other embodiments, the tie 12 is not initially attached to the clasp 14, but instead has a free distal end and a joined end coupled to another object. In this embodiment, the tie and clasp do not form a loop when the tie is inserted in the latch. Instead, the tie or the clasp may be connected to one relatively movable object (for example a door) and the other may be attached to another adjacent object (for example a door jam). The tie 12 may then be inserted in the clasp 14 and tightened to join the two relatively moveable objects without forming a loop to connect the objects.

Figure 9:
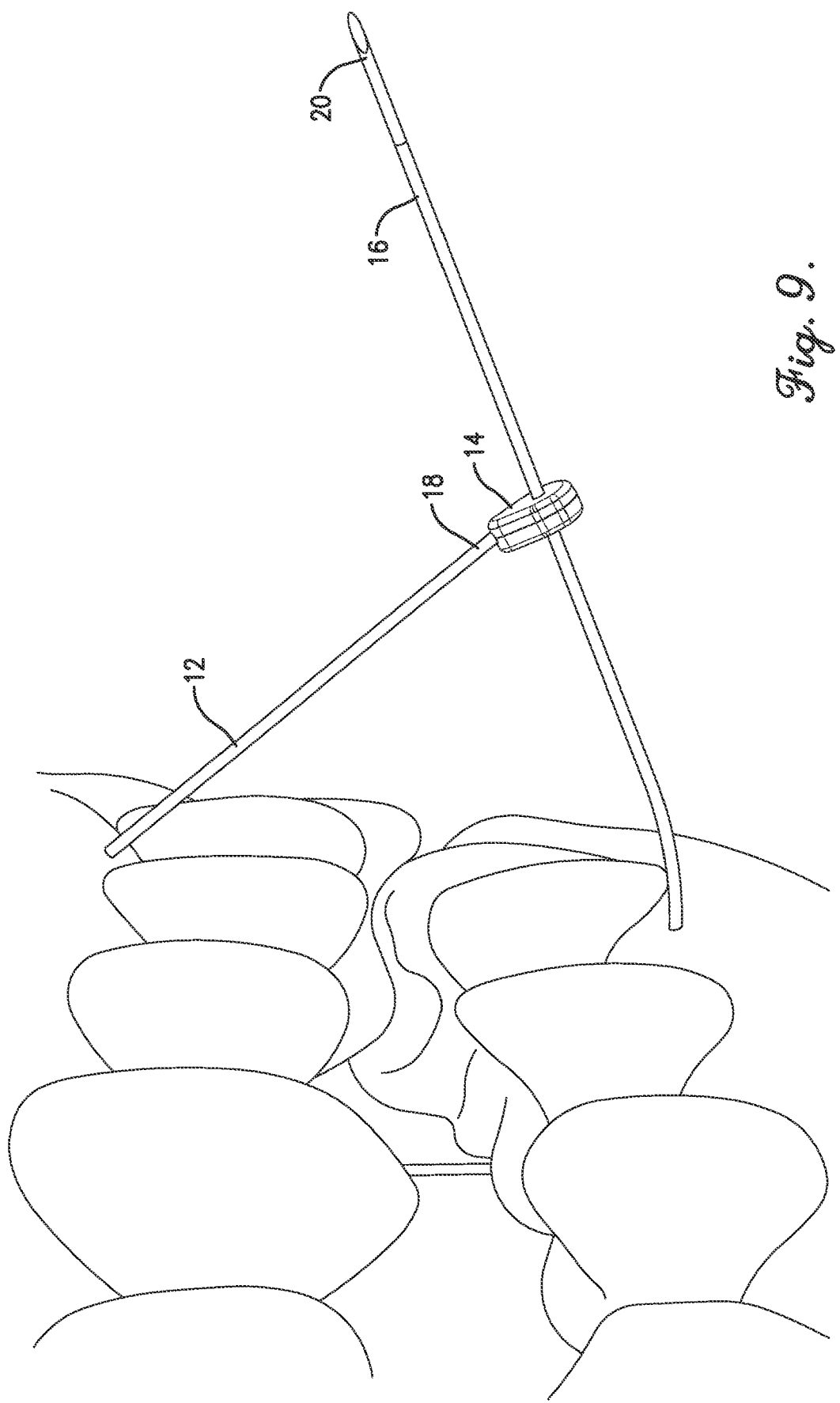
FIG. 9 is a perspective view showing one fixation mechanism being used to secure a patient's jaw.

In some embodiments, a needle or other introducer 20 is attached to the distal end 16 of the tie to facilitate insertion of the tie in the interdental space of a patient's oral cavity as illustrated in FIGS. 9-11 and described in more detail in U.S. Pat. No. 11,045,235.

Turning now to FIGS. 3 and 4, an embodiment of the clasp 14 broadly comprises a housing 22 and a locking mechanism 24 positioned inside the housing. For medical applications such as the one depicted in FIGS. 9-11, the clasp is preferably small. For non-medical applications, the clasp 14 may be much larger.

The housing 22 may be any shape and size and may be made of any suitable materials. When the fixation mechanism 10 is used in medical applications, the housing is preferably made of lightweight medical grade plastics. An embodiment of the housing 22 has mating first and second portions 26, 28 that snap together or are otherwise joined to contain the locking mechanism 24.

As best shown in FIG. 3, the first housing portion 26 includes a recessed region 30 in which the locking mechanism 24 is positioned and a number of mounting post holes 32. The first housing portion 26 also includes a recessed region 54 that together with a recessed region on the second housing portion forms an opening through which the joined end 18 of the tie 12 exits the housing 14.

The first housing portion 26 also includes an insertion channel 34 through which the free end 16 of the tie 12 may be inserted as explained in more detail below. The insertion channel 34 is sized and configured to promote optimal positioning and orientation of the tie 12 as it enters the clasp 14 to enhance the locking of the tie and clasp. In one embodiment, best shown in FIG. 6, the insertion channel 34 has a relatively enlarged opening 36 that tapers inwardly to a relatively narrower throat 38. The opening 36 has an inside diameter greater than the outside diameter of the tie 12, and the throat 38 portion has an inside diameter approximately equal to but slightly larger than the outside diameter of the tie. In one embodiment, the diameter of the opening 36 is 10-30% greater than the diameter of the tie, and the diameter of the throat is 1-10% greater than the diameter of the tie. The relatively larger opening 36 facilitates easy insertion of the tie into the insertion channel 34, and the relatively narrower throat 38 orients the tie 12 perpendicular to a longitudinal axis of the clasp housing, thus preventing the tie from entering the clasp housing at an angle that could inhibit proper engagement with the locking mechanism.

Figure 6:
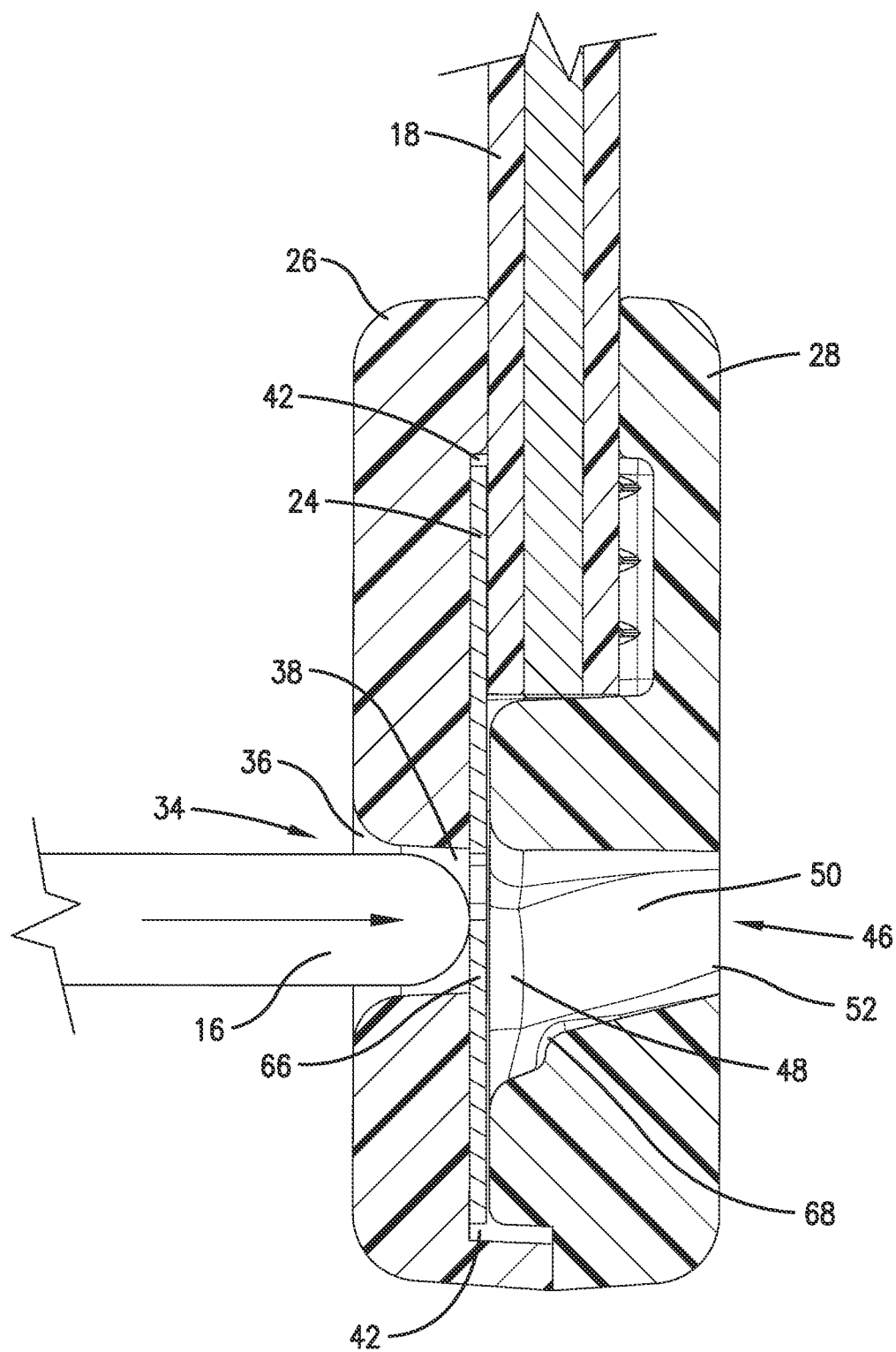
FIG. 6 is a sectional view of the fixation mechanism taken along line 6/6 of FIG. 5 and showing the free end of the tie as it is inserted in the insertion channel.

As best shown in FIGS. 4 and 6, the second housing portion 28 has a raised portion 40 that is received within the recessed region 30 of the first housing portion 26. When the first and second housing portions are joined, a narrow gap 42 remains between the raised portion 40 and the recessed region 30 to accommodate the locking mechanism 24 as best shown in FIG. 6. The second housing portion also has a number of mounting posts 44 that are inserted in the mounting post holes 32 of the first housing portion. The second housing portion 28 also includes a recessed region 56 that together with the recessed region 54 on the first housing portion forms an opening through which the joined end 18 of the tie 12 exits the housing 14.

The second housing portion 28 also comprises an exit channel 46 through which the free end 16 of the tie 12 exits as explained in more detail below. The exit channel 46 is sized and configured to promote optimal positioning and orientation of the tie 12 as it enters the channel 46 and exits the clasp to enhance the locking of the tie and clasp.

In one embodiment, best shown in FIG. 6, the exit channel 46 has a relatively enlarged opening 48 adjacent to and contiguous with the throat 38 of the insertion channel 34. The opening 48 tapers inwardly to a relatively narrower throat 50. The opening 48 has an inside diameter greater than the outside diameter of the tie and greater than the inside diameters of all portions of the insertion channel. The throat 50 tapers inwardly across its entire length and terminates in an exit 52 with an inside diameter approximately equal to but slightly larger than the outside diameter of the tie 12. In one embodiment, the diameter of the opening 48 is 30-100% greater than the diameter of the tie and the diameter of the exit 52 is 1-10% greater than the diameter of the tie. The relatively larger opening 48 accommodates movement of the locking mechanism as discussed below, and the relatively narrower throat 50 and exit 52 orient the tie perpendicular to a longitudinal axis of the clasp housing as the tie exits the housing, thus preventing the tie from entering and exiting the clasp at an angle that could inhibit proper engagement with the locking mechanism.

The locking mechanism 24 is positioned between the first and second housing portions 26, 28 and is configured to permit the free end 16 of the tie to pass forwardly through the insertion channel 34 and out the exit channel 46 and to then grip the tie 12 to prevent it from moving rearwardly in a direction from the exit channel to the entry channel.

As best shown in FIG. 3, an embodiment of the locking mechanism 24 comprises a generally circular plate 58 and opposed crimping jaws 60, 62 integrally formed with or otherwise attached to the plate. The crimping jaws 60, 62 are crimped or otherwise pressed together around the joined end 18 of the tie to secure it to the locking mechanism 24 and the surrounding housing.

The plate 58 has a central aperture 64 that is contiguous with the insertion channel 34 and the exit channel 46 when the locking mechanism 24 is positioned in the housing. The plate further includes a locking tine 66 or tab with a proximal end joined to the plate portion and a free distal end extending into the aperture 64.

In one embodiment, the locking tine 66 is pre-bent such that the distal end of the locking tine is angled toward the exit channel at an angle of 40-80 degrees relative to the plate 58. In another embodiment, the locking tine 66 is initially within the same plane of the plate and is bent by the free end 16 of tie as the tie is inserted thought the clasp. In both embodiments, the tie 12 remains in contact with the locking tine 66 as it is threaded through the clasp while the locking tine deflects toward the exit channel 46 as described in more detail below.

Figure 7:
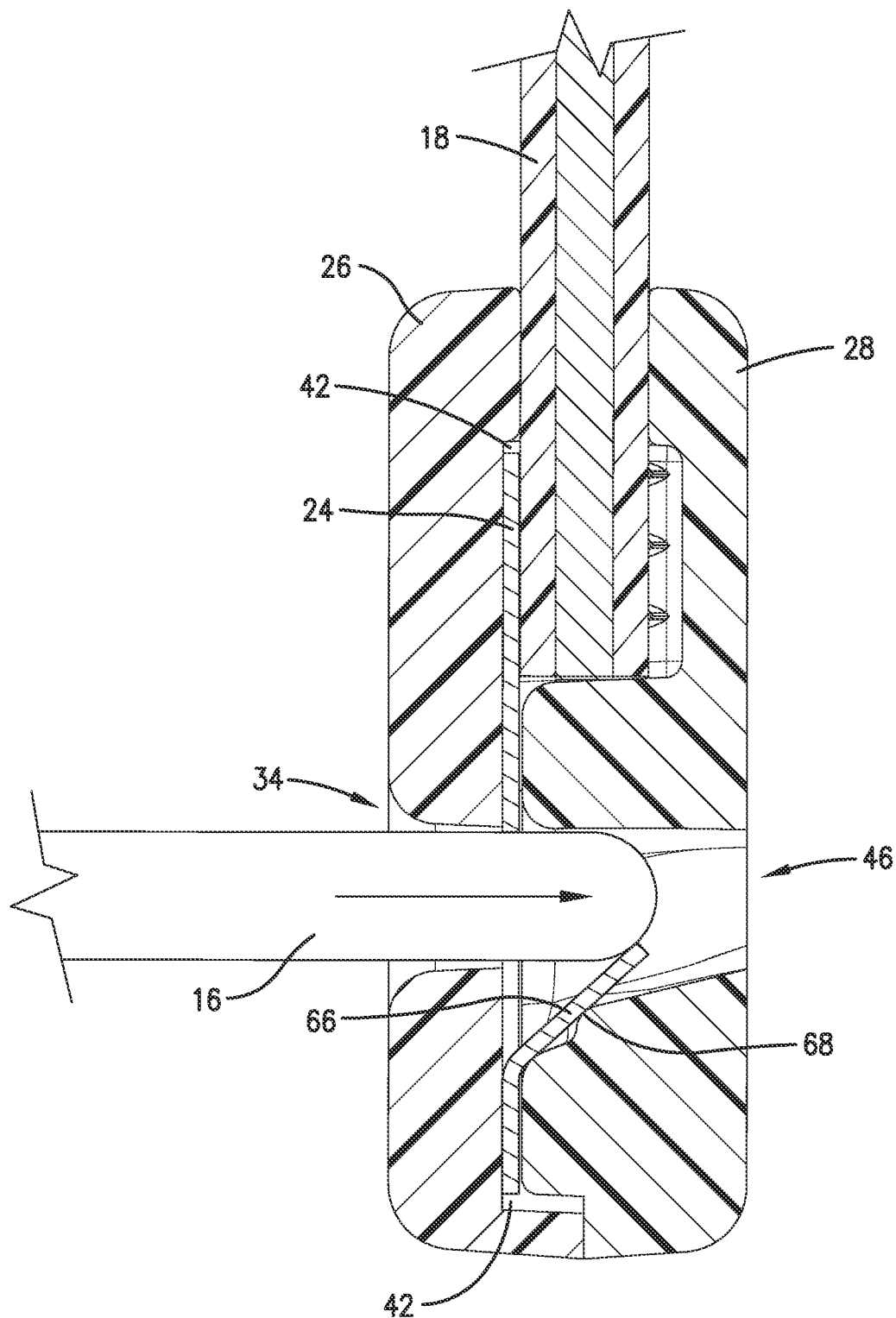
FIG. 7 is another sectional view of the fixation mechanism showing the free end of the tie as it is further inserted in the insertion channel and the exit channel.
Figure 8:
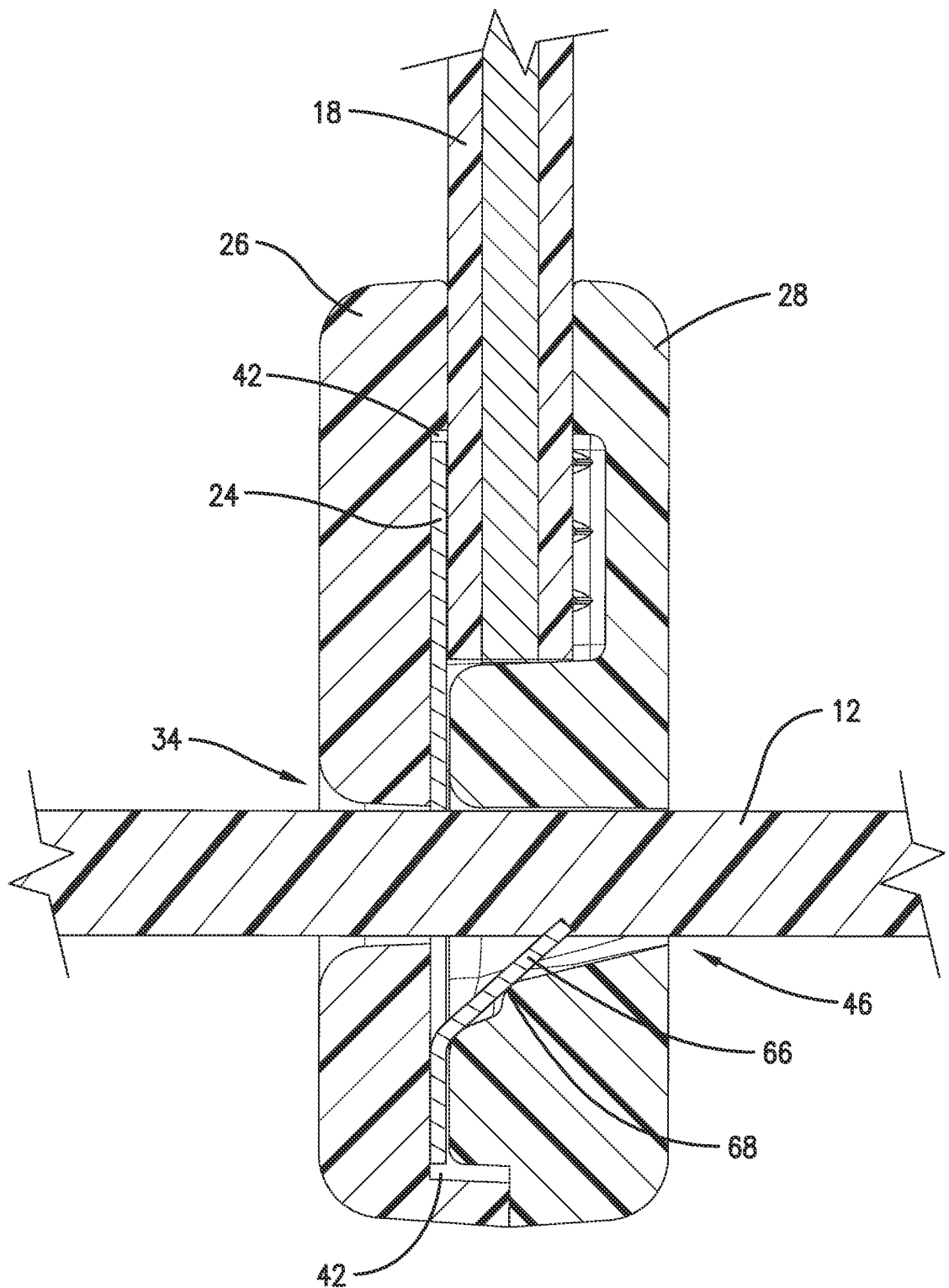
FIG. 8 is yet another sectional view of the fixation mechanism showing the free end of the tie as it is inserted in the insertion channel and threaded out the exit channel.

To prevent the locking tine 66 from deflecting or bending too far away from the tie 12, the housing 22 further comprises a raised ledge or projection 68 in the exit channel as best shown in FIGS. 4 and 6. The ledge 68 serves as a stop to limit bending of the locking tine as the tie is threaded through the clasp. This ensures the locking tine 66 stays in contact with the tie 12 as the tie is inserted in the clasp to promote more secure locking of the tie and clasp. In one embodiment, shown in FIG. 7, the ledge 68 contacts some of the surface area of the backside of the locking tine but does not contact the distal tip of the locking tine. This permits the locking tine 66 to deflect into the exit channel 46 when the tie 12 is inserted through the housing and to spring back to its original angle/orientation to lock the tie in the clasp if a user attempts to pull the tie rearwardly through the housing.

Use of several of the fixation mechanisms 10 will now be described with reference to 9-11. These figures illustrate fixation of a patient's jaw, but the same or similar steps may be performed to prevent relative movement between any relatively moveable objects. This mechanism could also be used to stabilize or reinforce a single object that may be at risk of "fragmenting" into relatively moveable objects. The description below also discusses components of the fixation mechanisms illustrated in the other figures.

First, the free end 16 of the tie 12 is inserted through, wrapped around, or otherwise connected to two or more relatively moveable objects. The introducer portion 20 of the tie 12 is then inserted in the insertion channel 34 of the clasp 14, pushed past the locking mechanism 24, and threaded out the exit channel 46 on the opposite side of the clasp.

The tie 12 contacts the locking tine 66 before entering the exit channel and remains in contact with the locking tine. As explained above, the insertion channel is of a diameter sufficiently narrow as to guide the introducer and tie perpendicular to the clasp housing, thus preventing the tie from entering the clasp at an angle that could negatively affect performance of the locking tine mechanism. The exit channel on the opposite side of the clasp housing and internal cavity is also sufficiently narrow to ensure proper orientation of the elongate body as it exits the housing, maintaining the proper angle of the elongate body to improve strength of locking.

To tighten the fixation mechanism, the free end of the tie is then pulled through the clasp until the jaws or other relatively moveable objects are closed or otherwise joined as shown in FIGS. 10 and 11. The locking mechanism grips the tie and prevents it from moving rearwardly in the clasp. While the tie is threaded through the clasp, the stop in the exit channel prevents the locking tine from over bending or being positioned too far away from the locking tine. Importantly, the insertion channel, exit channel, locking tine, and stop do not prevent the tie from passing through the clasp housing in a forward/tightening manner. Once the fixation mechanisms have been fully tightened, the portion of the tie extending from the clasp may be cut off.

ADDITIONAL CONSIDERATIONS

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A fixation mechanism for limiting relative movement between two adjacent objects, the fixation mechanism comprising:
   an elongated tie having a free end and a joined end, the tie having a smooth outer surface with no external teeth; and
   a clasp coupled to the joined end of the tie, the clasp comprising:
      a housing having an insertion channel in which the free end of the tie is inserted and an exit channel through which the tie exits, wherein the insertion channel and the exit channel have smooth walls with no locking teeth;
      a locking mechanism positioned in the housing, the locking mechanism including a locking tine configured to permit the tie to pass through the insertion channel and out the exit channel but to prevent the tie from moving rearwardly from the exit channel to the entry channel, the locking tine having a fixed proximal end and an opposite moveable distal end that contacts the tie, the locking mechanism further comprising a generally circular plate with a central aperture that is contiguous with the insertion channel, wherein the fixed proximal end of the locking tine is joined to the plate and the distal end of the locking tine extends into the aperture; and
      a stop that limits movement of the locking tine as the tie is threaded through the insertion channel and the exit channel, the stop contacts a portion of the locking tine between the fixed proximal end and the moveable distal end but does not contact the moveable distal end.

2. The fixation mechanism of claim 1, further comprising an introducer coupled with or integrally formed with the free end of the tie.

3. The fixation mechanism of claim 2, the introducer comprising a needle.

4. The fixation mechanism of claim 1, the housing having mating first and second housing portions, the locking mechanism being positioned between the first and second housing portions.

5. The fixation mechanism of claim 4, the insertion channel having an opening and a throat, the opening of the insertion channel having a diameter and the throat of the insertion channel having a diameter, the diameter of the opening being greater than the diameter of the throat.

6. The fixation mechanism of claim 1, the exit channel having an opening and an exit, the opening having a diameter and the exit having a diameter, the diameter of the opening being greater than the diameter of the exit.

7. The fixation mechanism of claim 5, the exit channel having a first end and a second end, the diameter of the first end of the exit channel being approximately twice the diameter of the second end of the exit channel.

8. The fixation mechanism of claim 5, the tie having a diameter, the diameter of the tie being 1-10% less than the diameter of the throat of the insertion channel.

9. The fixation mechanism of claim 1, wherein the tie contacts the locking tine and deflects it toward the exit channel as the tie passes through the insertion channel and the exit channel, and wherein the locking tine grips the tie to prevent the tie from moving rearwardly from the exit channel toward the entry channel.

10. The fixation mechanism of claim 1, the stop comprising a projection in the exit channel that is contacted by the locking tine when the tie passes through the insertion channel and the exit channel to limit movement of the locking tine toward the exit channel.

11. A fixation mechanism for preventing relative movement between two adjacent objects, the fixation mechanism comprising:
   an elongated tie configured to be coupled to a first one of the adjacent objects, the tie having a free end, the tie having a smooth outer surface with no external teeth; and
   a clasp configured to be coupled to a second one of the adjacent objects, the clasp comprising
   a housing having an insertion channel in which the free end of the tie is inserted and an exit channel through which the free end of the tie exits, wherein the insertion channel and the exit channel have smooth walls with no locking teeth;
   a locking mechanism positioned in the housing, the locking mechanism including a locking tine configured to permit the free end of the tie to pass through the insertion channel and out the exit channel and to penetrate the outer surface of the tie to prevent the free end of tie from moving rearwardly from the exit channel to the entry channel, the locking tine having a fixed proximal end and an opposite moveable distal end that contacts the tie, the locking mechanism further comprising a generally circular plate with a central aperture that is contiguous with the insertion channel, wherein the fixed proximal end of the locking tine is joined to the plate and the distal end of the locking tine extends into the aperture; and a stop that limits movement of the locking tine as the tie is threaded through the insertion channel and the exit channel, the stop contacts a portion of the locking tine between the fixed proximal end and the moveable distal end but does not contact the moveable distal end.

12. The fixation mechanism of claim 11, further comprising an introducer coupled with or integrally formed with the free end of the tie.

13. The fixation mechanism of claim 11, the housing having an mating first and second portions, the locking mechanism being positioned between the first and second portions.

14. The fixation mechanism of claim 11, the insertion channel having an opening and a throat, the opening having a diameter and the throat having a diameter, the diameter of the opening being greater than the diameter of the throat.

15. The fixation mechanism of claim 14, the exit channel having an opening and an exit, the opening having a diameter and the exit having a diameter, the diameter of the opening being greater than the diameter of the exit.

16. The fixation mechanism of claim 15, the diameter of the throat of the insertion channel being approximately equal to the diameter of the exit of the exit channel.

17. The fixation mechanism of claim 16, the tie having a diameter, the diameter of the tie being 1-10% smaller than the diameter of the throat of the insertion channel.

18. The fixation mechanism of claim 11, wherein the tie contacts the locking tine and deflects it toward the exit channel as the tie passes through the insertion channel and the exit channel, and wherein the locking tine grips the tie to prevent the tie from moving rearwardly from the exit channel toward the entry channel.

19. The fixation mechanism of claim 11, the stop comprising a projection in the exit channel that is contacted by the locking tine when the tie passes through the insertion channel and the exit channel to limit movement of the locking tine away from the insertion channel.

20. The fixation mechanism of claim 1, wherein the two adjacent objects are parts of a human body.

* * * * *